United States Patent Office 2,891,950
Patented June 23, 1959

2,891,950

PROCESS FOR THE PREPARATION OF ANHYDRO BASES FROM CYCLAMMONIUM QUATERNARY SALTS

Robert M. Lindquist, Vestal, N.Y.

No Drawing. Application September 25, 1956
Serial No. 612,065

3 Claims. (Cl. 260—240)

This invention relates to anhydro bases and particularly to a process for the preparation of said bases from cyclammonium quaternary salts.

The anhydro bases of this invention are represented by the following general formula:

(I)
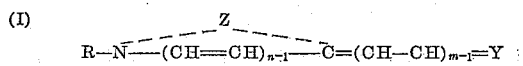

wherein R represents an aliphatic group such as an alkyl group, i.e., methyl, ethyl, n-propyl, n-butyl, isobutyl, allyl, alkoxyalkyl, i.e., β-ethoxyethyl, hydroxyalkyl, i.e., β-hydroxyethyl, carboxyalkyl, i.e., carboxymethyl, carboxyethyl, aralkyl, i.e., benzyl, phenethyl, etc., aryl, i.e., phenyl, naphthyl, $n$ represents a positive integer of from 1 to 2, Z represents the non-metallic atoms necessary to complete a heterocyclic nucleus containing from 5 to 6 members, i.e., nuclei of the oxazole series, such as 4-methyloxazole, 4-phenyloxazole, 5-methyloxazole, etc., nuclei of the benzoxazole series, such as benzoxazole, 5-chlorobenzoxazole, 5-phenylbenzoxazole, 5-methylbenzoxazole, 5-methoxybenzoxazole, etc., nuclei of the naphthoxazole series, such as α-naphthoxazole, β-naphthoxazole, etc., nuclei of the quinoline series, such as quinoline, 6-methoxyquinoline, 5-ethoxyquinoline, nuclei of the isoquinoline series, nuclei of the pyridine series, such as pyridine, picoline, etc., and $m$ is a positive integer of from 1 to 4. When $m$ is equal to 1, then Y represents a divalent group such as methylene, alkylmethylene, i.e., ethylmethylene, dialkylmethylene, i.e., dimethylmethylene, arylalkylmethylene, i.e., benzylmethylene, arylmethylene, i.e., phenylmethylene, diarylmethylene, i.e, diphenylmethylene, etc. When $m$ is equal to 2, 3 or 4, then Y represents a divalent arylimino group, i.e., phenylimino, p-chlorophenylimino, o-methoxyphenylimino, m-bromophenylimino, o-, p-, and m-tolylimino, p-nithrophenylimino, α- and β- naphthylimino, etc.

It has been proposed to prepare anhydro bases of the type represented by general Formula I, by treating cyclammonium quaternary salts with strong bases such as triethylamine or sodium hydroxide in order to abstract the elements HX as represented in the following general scheme:

(II)
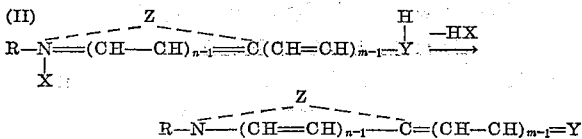

The usual prior art procedure consists in treating an aqueous solution of a cyclammonium quaternary salt with strong alkali to obtain the anhydro base either as a solid or a liquid. If the anhydro base is highly insoluble in the reaction mixture, it was isolated by filtration. If, however, the solid was highly soluble in such mixture, or is in the form of a liquid, it was isolated by extracting said base from the reaction mixture with a water immiscible solvent. Thus, Vongerichten and Hofchen, Ber., 1908, 41, 3054, treated quinaldine ethiodide with aqueous KOH and obtained an oil which they regarded as having the following structure:

(III)
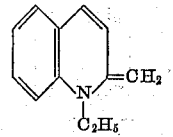

Such compounds, resulting from the elimination of HX from methyl cyclammonium heterocyclic quaternary salts, were called methylene bases. A more recent article by Hamer, J. Chem. Soc., 1947, 954–959, describes other anhydro bases and their derivatives as well as improved methods of synthesis.

One of the main objections to the previous methods of making anhydro bases is the deleterious effect of the strong alkali employed. Many of the anhydro bases are very sensitive compounds and undergo decomposition in the presence of strong alkali, and makes it difficult to isolate in pure form while ensuring good yields.

Since the anhydro bases and their derivatives are useful intermediates in sensitizing dye syntheses, particularly where milder reaction conditions are required, an improved method of producing said bases has long been in demand.

It is to be pointed out that, ordinarily, said bases are not used as such in sensitizing dye syntheses owing to the inconvenience of their separate preparation. Instead, they are prepared in situ in the course of the sensitizing dye syntheses by the addition of basic catalysts.

It is an object of this invention to provide a general method for the facile preparation of anhydro bases of cyclammonium heterocyclic quaternary salts which eliminates the deleterious effects of strong alkalis.

Another object of this invention is to provide said bases in an isolated condition for use in sensitizing dye syntheses so that such syntheses can be carried out under milder reaction conditions and with fewer byproducts.

We have found that when a solution of a cyclammonium quaternary salt is passed through a column packed with an anion-exchange resin which has been regenerated to its hydroxide form, the elements HX (where H is hydrogen and X is the anion of the quaternary salt), are removed from the quaternary salt by the resin, and the methylene base or its equivalent passes on through the column and is obtained in pure form in the effluent liquor from the column. In this method, the methylene base is in contact with the alkaline —OH groups of the ion-exchange resin for a very short interval so that any side reactions due to the action of alkali are eliminated.

An alternate procedure is to stir a solution of a cyclammonium quaternary salt with one of more portions of an anion-exchange resin which has been regenerated to its hydroxide form, until the elements of HX (where H is hydrogen and X is the anion of the quaternary salt), have been completely removed from the quaternary salt by the resin. This point may be ascertained by testing the solution for the presence of the anion X. The resin can then be removed by filtration to give a solution of the methylene base.

A generalized formulation for the involved reaction is as follows:

(IV)
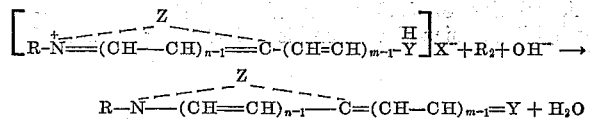

wherein Z, R, X, Y, $m$ and $n$ have the values shown above.

The term "anhydro base" as used herein is defined in "The Organic Chemistry of Nitrogen," 1937 (Taylor and Baker).

The anion exchange resins contemplated herein are highly basic resinous quaternary ammonium bases or salts thereof. The starting material for the aforementioned highly basic anion exchange resins may be the well-known weakly basis anion exchange resins containing amino groups. They are made, for example, by reacting a phenol-aldehyde condensate with formaldehyde and a secondary amine, or an aliphatic polyamine according to the disclosures of U.S. Patent, 2,732,352 or by condensing a phenylenediamine with formaldehyde, followed by alkylation to convert primary and secondary amino groups to tertiary amino groups and quaternizing such amino groups with alkyl halides as disclosed in U.S. Patent 2,732,352.

Alternately, the highly basic anion exchange resins may be prepared by halomethylating a cross-linked insoluble copolymer of a monovinyl hydrocarbon such as styrene and then aminating the halomethylated copolymer by reaction with a tertiary amine followed by conversion of the resulting resinous quaternary salt to the highly basic hydroxide form by treating said resinous quaternary salt with an alkali such as sodium hydroxide as disclosed in U.S. Patent 2,591,573.

The anion exchange resin employed in the present application is a type sold on the market under the trade name "Amberlite IRA–400" by the Rohm and Haas Company, said "Amberlite IRA–400" being dispensed in the form of a quaternary halide, i.e., chloride, and may be regenerated to the hydroxide form by treatment with dilute alkali such as sodium hydroxide.

The invention is further illustrated by the following examples but is not restricted thereto.

*Example I*

A solution of 1 gram of 3-ethyl-2-methylbenzoxazolium iodide in 50 mls. of methanol was passed through a column packed with 20 mls. of regenerated Amberlite IRA–400 (regenerated with 4% aqueous sodium hydroxide, washed neutral with water and washed with methanol) and was followed by an afterwash of 50 mls. of methanol. The effluent liquor gave a negative Beilstein test for halogen. Evaporation of a small portion of the effluent liquor left a yellow gum which was soluble in ether and which was insoluble in water. A test portion of the effluent liquor coupled readily with 2-($\beta$-acetanilidovinyl)-3-ethylbenzoxazolium iodide on boiling and the addition of a few crystals of sodium acetate. The starting material did not couple readily under these conditions.

*Example II*

A solution of 1 gram of 3-ethyl-2-methylbenzothiazolium iodide in 50 mls. of methanol was passed through a column packed with 20 mls. of regenerated Amberlite IRA–400 (regenerated with 4% aqueous sodium hydroxide, washed neutral with water, and washed with methanol) and was followed by an afterwash of 50 mls. of methanol. The effluent liquor gave a negative Beilstein test for halogen. Evaporation of a small portion of the effluent liquor left a residue which was soluble in ether and which was insoluble in water. A test portion of the effluent liquor coupled readily with 2-($\beta$-acetanilidovinyl)-3-ethylbenzoxazolium iodide at room temperature with no catalyst.

*Example III*

A solution of 28.8 grams of 3-carbethoxymethyl-2-methyl benzothiazolium bromide in 300 mls. of methanol was passed through a column packed with 150 mls. of regenerated Amberlite IRA–400 (regenerated with 4% aqueous sodium hydroxide, washed neutral with water, and washed with methanol) and was followed by an afterwash of 250 mls. of methanol. The effluent liquor gave a negative Beilstein test for halogen. A small portion of the effluent liquor was evaporated to a gum which was soluble in ether and which was insoluble in water. A test portion of the effluent liquor coupled with 2-($\beta$-acetanilidovinyl)-3-ethylbenzoxazolium iodide immediately at room temperature with no catalyst.

*Example IV*

A solution of 2 grams of $\beta$-(4-chloro)-anilino-$\beta$-ethylvinyl-3-ethyl-5,6-dimethylbenzoxazolium iodide in 50 mls. of methanol was passed through a column packed in 20 mls. of regenerated Amberlite IRA–400 (regenerated with 4% aqueous sodium hydroxide, washed neutral with water, and washed with methanol) and was followed by an afterwash of 50 mls. of methanol. A portion of the effluent liquor was diluted with water and was acidified with dilute nitric acid. Addition of silver nitrate solution to this solution gave no precipitate. The effluent liquor was evaporated to give an amorphous yellow powder which weighed 1.4 grams. The melting point was 45–49° C. The product was soluble in ether and was insoluble in water.

I claim:

1. A process of preparing anhydro bases which comprises treating with an ion exchange resin regenerated to its hydroxide form, a cyclammonium salt selected from the class consisting of those of the following formulae:

and

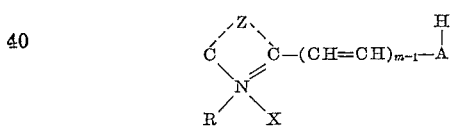

wherein Z represents the atoms necessary to complete a benzoxazole nucleus, R is selected from the class consisting of lower alkyl and carb lower alkoxy lower alkyl, X is an anion, Y is alkylene, $m$ is a whole number from 2 to 4, A is a divalent arylimino group selected from the class consisting of those of the benzene and naphthalene series and H is hydrogen.

2. The process of preparing an anhydro base which comprises treating with an ion exchange resin regenerated to its hydroxide form 3-ethyl-2-methylbenzoxazolium iodide.

3. The process of preparing an anhydro base which comprises treating with an ion exchange resin regenerated to its hydroxide form $\beta$-(4-chloro)-anilino-$\beta$-ethylvinyl-3-ethyl-5,6-dimethylbenzoxazolium iodide.

References Cited in the file of this patent

UNITED STATES PATENTS

| 2,484,536 | Straete | Oct. 11, 1949 |
| 2,635,061 | McBurney | Apr. 14, 1953 |

OTHER REFERENCES

Kressman: Research, May 1952, pp. 212–219.

Chem. and Eng. News, vol. 27, No. 21, p. 1525, May 1949.

UNITED STATES PATENT OFFICE
CERTIFICATE OF CORRECTION

Patent No. 2,891,950 June 23, 1959

Robert M. Lindquist

It is hereby certified that error appears in the printed specification of the above numbered patent requiring correction and that the said Letters Patent should read as corrected below.

Column 4, line 16, "packed in 20" read -- packed with 20 --.

Signed and sealed this 10th day of November 1959.

(SEAL)
Attest:

KARL H. AXLINE
Attesting Officer

ROBERT C. WATSON
Commissioner of Patents